C. O. GEHRCKENS.
DRIVING BELT.
APPLICATION FILED JAN. 4, 1910.
992,494.
Patented May 16, 1911.
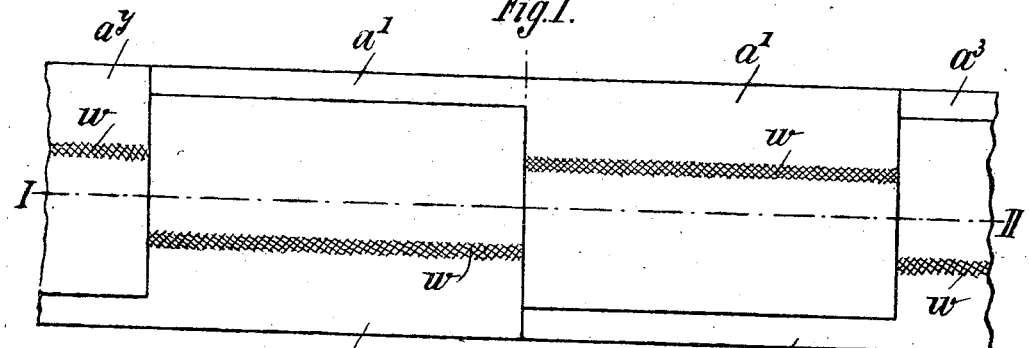
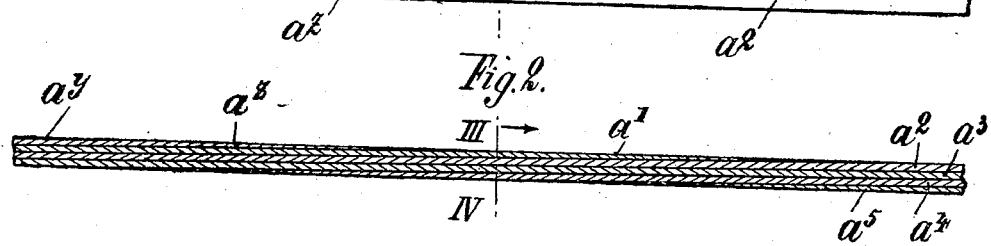
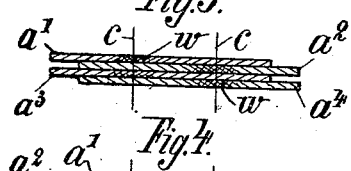
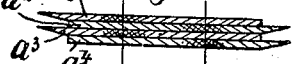
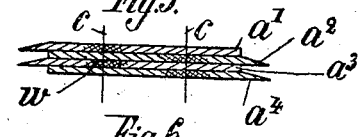
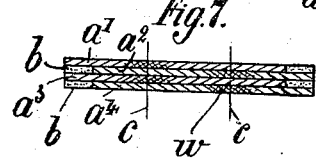
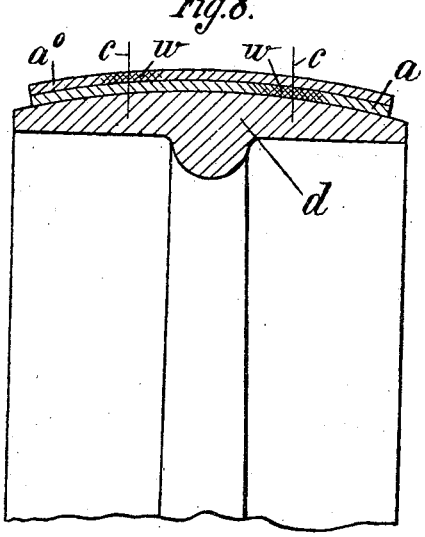
Witnesses
B. V. Sommers
May Ellis
Inventor
Carl Otto Gehrckens
By Henry Orth
Atty

UNITED STATES PATENT OFFICE.

CARL OTTO GEHRCKENS, OF HAMBURG, GERMANY.

DRIVING-BELT.

992,494.  Specification of Letters Patent.  Patented May 16, 1911.

Application filed January 4, 1910. Serial No. 536,291.

*To all whom it may concern:*

Be it known that I, CARL OTTO GEHRCKENS, a citizen of the German Empire, residing at Hamburg, Germany, have invented certain new and useful Improvements in Driving-Belts, of which the following is a specification.

The present invention relates to improvements in driving belts composed of two or more longitudinal strips or layers.

For high velocities a belt is most suitable which consists of a band of leather, cut from that portion of the hide between the neck and tail of the animal. This leather band contains a hardened portion of reduced elasticity, due to natural conditions, running down the entire length and approximately in the center thereof. This tough part of the leather band will hereinafter be referred to as the back zone.

Owing to the great belt velocity now used with machines, which velocities should increase within a measurable space of time by the improvement of machinery, there are two occurrences perceptible viz. the lateral swaying of the belt (the lateral to and fro or seesaw motion of the belt on the pulley) and the undulation in the slack side or part of the belt.

The lateral seesaw motion of the belt is to be traced to the fact that the back zones of the hide contained in the leather strips of which the belt is composed, do not run in a straight line, but more or less in a curved or sickle-shaped line. It is this curved course of the back zones and the smaller elasticity of these harder portions in such backs to which the lateral seesaw motion of the belt is due.

The undulation in the slack side or part of the belt is engendered by the jumping or bucking of the belt on its engaging with the driven pulley. This bucking of the belt may be explained in the following manner: The belt when engaging with the driven pulley, is at first slightly and momentarily contacting the said pulley at one point, then again removing or rising therefrom it leaves the pulley for a certain distance untouched and only after that contacts the pulley again and attaches or applies itself tightly to the pulley. The vibration caused by this bucking of the belt continues as undulatory movement oppositely to the working direction of the belt. This occurrence is probably engendered by the fact that owing to the stiffness and imperfect elasticity of the belt the smallest belt particles, being in closest juxtaposition, are not capable or adapted to yield quickly enough when the belt is beginning to curve itself around the pulley, but, on account of the inertia tend to travel along in a straight direction. It is evident and can be observed daily in practice that these repeated blows of the belt, the number of which increases to an immense amount with an increased speed of rotation, will weaken the multiple belt, especially attacking the edges of the belt strips and acting to separate the latter from one another. Moreover unsuitably formed crowns of the pulleys, made at pleasure, very often enormously aggravate the undulating, flapping, rocking and rolling motions of the belt.

The object of invention relative to the avoidance of the lateral seesaw motion of the belt is attained by arranging or laying the leather strips in a series one upon another in such a manner that the back zones of the said strips are in a longitudinal middle zone of the belt and alternate with one another within this middle zone transversely to the longitudinal direction of the belt.

The undulation of the belt is obviated by arranging the leather strips having their back zones alternating in transverse direction in a series overlapping one another in longitudinal direction; the ends of the strips being tapered for this purpose to produce flush inner and outer surfaces of the belt.

To insure the steady running of the belt in a still higher degree, it is advisable to make all the leather strips of which the belt is composed, of the same width and to alternate the strips with their back zones transversely and symmetrically to the middle position or the longitudinal center line of the belt in such a manner that the longitudinal edges of the strips protrude in alternate order.

The strips are connected with one another by cementing or any other suitable means so as to form an endless web of belting.

In the accompanying drawings: Figure 1 is a plan. Fig. 2 a longitudinal section on the line I—II of Fig. 1 and Fig. 3 a cross-section on the line III—IV of Fig. 2, of a driving belt composed of a series of leather strips overlapping one another with their ends and having their back zones also arranged alternately to the longitudinal middle line of the belt. Figs. 4 to 7 are cross-sectional views similar to Fig. 3, illustrating modifications of the improved driving belt, and Fig. 8 is a cross-sectional view of a pulley with a belt thereon composed of two leather strips the back zones of which alternate with one another transversely with respect to the longitudinal center line of the belt.

Similar letters refer to like parts throughout the several figures.

The belt shown in Fig. 8 is composed of two leather strips $a$ and $a^o$ each having a back zone $w$. The strips $a$ and $a^o$ are superimposed so that the back zones $w$ are not above each other in the center line of the belting and the crowned pulley $d$, but are alternately at the sides of this line, that is to say the back zone $w$ of the strips $a$ is situated at the right side and the corresponding zone $w$ of the strip $a^o$ at the left side at a place between the center line and the corresponding border or lateral edge of the belting, as is evident from Fig. 8 in which the back zones of harder material are indicated by cross shading. In this manner the finished belt is provided with a middle zone of weaker or more yielding or flexible material bordered at each side by a zone $w$ of less flexible material, while the edges or rim zones of the belt are again of more flexible material. This feature of the invention is recurring in each of the modifications shown in the drawings and to be described later on.

When a belt of the kind shown in Fig. 8 is running, the zone $w$ of the strip $a$ tends to travel to the right, whereas the zone $w$ of the strip $a^o$ tends to slide to the left thereby engendering two oppositely directed forces which counterbalance each other, so that the belt is running in a straight direction without any material lateral seesaw motion, the yielding or more flexible middle zone between the less flexible zones $w$ being closely applied to the crown of the pulley $d$ and prevented from lateral displacement by the said zones $w$.

Referring to Figs. 1 to 3 the several leather strips $a^1, a^2, a^3, a^4, a^5 \ldots a^z$ are cut of equal breadth or width and tapered at both ends, see Fig. 2; they are placed in a series overlapping one another and connected in this position by cementing, so as to form an endless web of belting with practically flush inner and outer surfaces. In putting the strips together they are placed to alternate in transverse direction so that the minor flexible back zones $w$, indicated by cross lines, are at the right and at the left side of the longitudinal center line of the belt. Owing to this transverse alternateness of the strips the longitudinal edges of the latter protrude in alternate double or multiple order; see Figs. 1 and 3.

The protruding edges of the strips may be wedge-shaped or tapered (Figs. 4 and 5) or partly or entirely cut away (Fig. 6). In some cases it may be advisable to fill up the free spaces seen in Fig. 3, between the edges of the strips by means of filling pieces $b$ of leather or any other suitable material (see Fig. 7).

I claim:—

1. A driving belt composed of two or more longitudinal strips or layers of leather in which the strips are placed and secured together in such a manner, that the back zones of the individual strips are arranged in a longitudinal middle zone of the belt but alternate with one another within this middle zone in the transverse direction of the belt, the back zones at one side of the longitudinal center line of the belt counteracting a tendency of the back zones at the other side of the said center line to slide laterally on the pulley when the belt is in use.

2. A driving belt composed of two or more longitudinal strips or layers of leather in which the strips are placed and secured together in such a manner that the back zones of the individual strips are arranged in a longitudinal middle zone of the belt but alternate with one another within this middle zone in the transverse direction of the belt, the ends of the strips being tapered and placed and secured together one above the other in a series in such a manner that the individual strips overlap one another at the inner and outer surface of the belt.

3. A driving belt composed of a plurality of superposed leather strips of equal width overlapping one another longitudinally, the longitudinal edge of one strip projecting beyond the longitudinal edge of the adjacent strip.

4. A driving belt composed of a plurality of superposed leather strips of equal width overlapping one another longitudinally and having their back zones alternating transversely of the longitudinal center line of the belt, the longitudinal edges of one strip projecting beyond the longitudinal edge of the adjacent strip.

5. A driving belt composed of a plurality of superposed leather strips of equal width having tapered overlapping ends, said strips secured together with their back zones alternating transversely of the longitudinal center line of the belt, one edge of each strip being tapered and projecting laterally beyond the edge of the adjacent strip.

CARL OTTO GEHRCKENS.

Witnesses:
ERNEST H. L. MUMMENHOFF,
ALEXANDER SPECKS.

Copies of this patent may be obtained for five cents each, by addressing the "Commissioner of Patents, Washington, D. C."